United States Patent [19]

Petersen

[11] 4,382,908
[45] May 10, 1983

[54] AFTER-HEAT REMOVAL SYSTEM FOR A GAS-COOLED NUCLEAR REACTOR

[75] Inventor: Klaus Petersen, Herzogenrath-Kohlscheid, Fed. Rep. of Germany

[73] Assignee: Kernforschungsanlage Jülich Gesellschaft mit beschränkter Haftung, Jülich, Fed. Rep. of Germany

[21] Appl. No.: 279,331

[22] Filed: Jul. 1, 1981

[30] Foreign Application Priority Data

Jul. 4, 1980 [DE] Fed. Rep. of Germany ....... 3025336

[51] Int. Cl.³ .............................................. G21C 15/18
[52] U.S. Cl. ................................... 376/299; 376/287; 376/381
[58] Field of Search ............... 376/381, 382, 298, 299, 376/287, 282

[56] References Cited

U.S. PATENT DOCUMENTS 4,243,487  6/1981  Schweiger .......................... 376/298

FOREIGN PATENT DOCUMENTS 2159696 10/1973 Fed. Rep. of Germany .
2440140  7/1975 Fed. Rep. of Germany .
2640786  3/1978 Fed. Rep. of Germany ...... 376/299
2713463 10/1978 Fed. Rep. of Germany .

Primary Examiner—Harvey E. Behrend
Attorney, Agent, or Firm—Karl F. Ross; Herbert Dubno

[57] ABSTRACT

An after-heat removal system for a nuclear reactor, especially a gas-cooled nuclear reactor in which the core is formed by a pile of spherical nuclear fuel elements, comprises an outlet in the side reflector of the reactor core which is connected to an after-heat removal system and draws the hot gases from a location within the pile, the return line from the after-heat removal system opening into the main cooling gas inlet.

8 Claims, 3 Drawing Figures

AFTER-HEAT REMOVAL SYSTEM FOR A GAS-COOLED NUCLEAR REACTOR

FIELD OF THE INVENTION

My present invention relates to the operation of a nuclear reactor and especially a gas-cooled nuclear reactor whose core is composed at least in part of a pile of spherical nuclear fuel elements. The invention is especially directed to an after-heat removal system for a nuclear reactor of this type.

BACKGROUND OF THE INVENTION

Among the various reactor designs, there are gas-cooled piled-ball nuclear reactors whose core can comprise, in a vessel forming side, bottom and top reflectors, a piled mass of nuclear-pile elements in the form of balls. The latter can be composed of graphite and can contain uranium or thorium or oxides or other compounds thereof directly or in the form of ceramic-like particles embedded in the graphite balls.

A conventional cooling system having a gas-cooled reactor of this type has a cooling gas inlet at the top of the reactor, a cooling gas outlet at the bottom of the reactor, and a blower, compressor or other means for displacing the gas which forms the primary coolant because it is forced directly through the mass of balls. The gas passes from the outlet through a main heat exchanger or gas cooler in which the gas can be cooled by indirect heat exchange with a secondary coolant, the latter being cooled by a tertiary coolant or serving directly as a power-transfer agent if, for example, the secondary coolant is water which is converted to steam and used to drive an electricity-generating turbine.

When a reactor of this type is shut down, it is common practice to close down the main cooling system. Nevertheless, residual fission heat must be dissipated for the duration of the shutdown, i.e. frequently for relatively long periods.

It is thus imperative to provide the reactor with means for removing the after heat, i.e. the heat resulting from nuclear decay in a shut-down reactor of the aforedescribed type when the primary coolant system is cut out.

Thus is has already been proposed to provide an after-heat auxiliary cooling gas cycle in parallel to the main cooling gas circulation, referred to hereinafter as the operating loop. The operating loop and the after-heat removal system are coupled together at the cooling gas inlet and the cooling gas outlet of the reactor core.

With such systems, however, it is difficult to reliably throttle the flow of the auxiliary gas stream through the operating loop or to utilize reliably the components of the primary cooling system to dissipate the after heat.

Bypasses and the like have been provided in the operating loop but these have not proved to be fully effective because they were incapable of preventing the entrainment of corrosive media from the operating loop into the reactor core which promoted graphite corrosion.

Mention may also be made of the fact that the operating loop, especially for high-temperature reactors, generally includes gas turbines, ducts of large-flow cross section, adjustable turbine blade arrangements, multiple cooling gas paths and the like which cannot be readily adjusted for after-heat removal and do not lend themselves to operation with the more limited gas flow rates for after-heat removal.

For example, German patent document No. 27 13 463 provides parallel operating loops with partitions separating them in the cooling-gas chambers which have not been utilized effectively for after-gas cooling.

With high-temperature reactors having gas turbines as described in German patent documents No. 21 59 696 and 24 40 140, the after-heat removal can be effected by utilizing operating loops which are not shut down, by opening a bypass in the working gas circulating path or by operating a secondary water emergency cooling gas circulation.

With this arrangement as well the after-heat removal system is coupled with the operating loop and/or emergency cooling system so that flow cross sections must be provided for the cooling gas which are not fully effective for the rapid removal of this after heat.

it is obviously desirable to remove the after heat at as low a temperature as is possible with a minimum gas flow and this cannot be accomplished readily when the operating loop is coupled with the after-cooling system and components of the operating loop, dimensioned for the primary coolant must be utilized for removal of the after heat. Furthermore, when the after cooling is effected utilizing the emergency cooling system, the latter must be provided at increased cost so that it can operate at the high temperatures which may be present in the cooling gas utilized for the removal of the after heat.

OBJECTS OF THE INVENTION

It is the principal object of the present invention to provide an after-heat removal system for a nuclear reactor of the aforedescribed type which obviates the disadvantages of earlier systems in which the after-heat removal was dependent completely or in large measure upon the primary cooling system or the operating loops of the reactor.

More specifically, it is an object of this invention to provide, for a gas-cooled nuclear reactor utilizing ball-type fuel elements and in which the reactor core is formed by a pile of such fuel elements, an after-heat removal system which is decoupled from the primary side operating loops and which will not foster the penetration of the reactor core by air, water or process gas in the event of a failure or rupture in the primary coolant system or one of the operating loops.

Still another object of this invention is to provide a system which cuts off the after-heat removal path at low gas temperatures or when the primary coolant system is effective.

Finally it is an object of this invention to provide an after-heat removal system which is reliable and of relatively low cost.

SUMMARY OF THE INVENTION

These objects and others which will become apparent hereinafter are attained, in accordance with the present invention, in an after-heat removal system for a gas-cooled nuclear reactor of the type in which the nuclear reactor core is formed by a pile of ball-shaped nuclear-fuel elements (ball pile) enclosed in a vessel whose side wall or side reflector surrounds the pile and which is provided with a gas inlet and a gas outlet forming part of a primary coolant system for the reactor, the inlet and outlet being provided at the opposite axial ends, e.g. the top and bottom, of the reactor. The primary coolant system can include at least one operating loop which includes a heat exchanger connected to the gas outlet and a compressor, blower or other gas-displacement device connected to the gas inlet whereby the primary coolant can be circulated through the reactor core.

According to the invention, an outlet for gas-carrying the after heat from the pile is provided in the side reflector in spaced relationship from the gas inlet and the gas outlet and opens within the pile of balls and leads to a cooler which is in turn connected to the gas inlet of the reactor.

The gas cooler for removing the after heat from the cooling gas circulated through the latter system may be a single exchanger or a plurality of heat exchangers.

The after heat which may be removed by the system of the invention is the heat of nuclear decay in the fuel elements upon shutdown of the reactor.

It will be apparent that this system utilizes only moderately heated cooling gas and at the same time decouples the after-heat removal system from the operating loops by using a separate gas outlet position. The after heat is extracted directly from the interior of the reactor core in an axial-position especially in a mid-way position where the heat is generated and thus the system is far more effective than after-heat removal arrangements utilizing an operating loop. Since the cooling gas temperature for after-heat removal is relatively low the overall coolant flow is limited because of the absence of bypasses through the main cooling systems, the cooler or heat exchanger for abstracting the heat from this fluid can be of smaller size and lower capacity, thereby keeping the operating and capital costs low and minimizing the space occupied by this cooler.

While I can provide a fluid-displacement means, e.g. a pump, blower or compressor, in the after-heat removal path, whether or not such a device is provided, it is advantageous to provide the outlet which communicates with the interior of the pile through the side reflector, as a riser which communicates with the top of the cooler or coolers, the latter being upright and having an outlet or outlets at the bottom which can be connected to the primary gas inlet advantageously located at the upper end of the reactor. As a result, gravity draws the cool gas downwardly into the gas inlet for return to the reactor core and a convective current can cause the gas to flow to the after-heat removal system.

Advantageously, the downcomer can be coaxial with the riser or the cooler or heat exchanger or both.

It has been found to be advantageous to provide, between the side reflector and the thermal shield therearound, a space which in part forms the cooling gas return line. Such systems have been found to increase the efficiency of removal of the after heat from the reactor core.

To prevent, during normal operation, any collateral flow of cooling gas through the after-heat path from and to the ball packing in the reactor core, I provide in the cooling gas return line of the after-heat removal system a closure, e.g. a check valve. This check valve can be a swingable flap valve which blocks the return line when the pressure in the gas inlet is the normal primary operating coolant pressure.

According to another feature of the invention, the connection between the after-heat removal system and the reactor core is provided in the side reflector element adapted to prevent direct neutron radiation outwardly. The outlet can be bent (arcuate), of spiral configuration or the like so that the outlet itself cannot serve for direct release of neutron radiation. Preferably, the reflector element for connection to the outlet duct is provided with inner and outer reflector bodies with linearly extending throughgoing openings. Neutron escape is provided by offsetting these openings.

Preferably, a plurality of after-heat removal loops are provided on the side reflector in parallel with one another.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
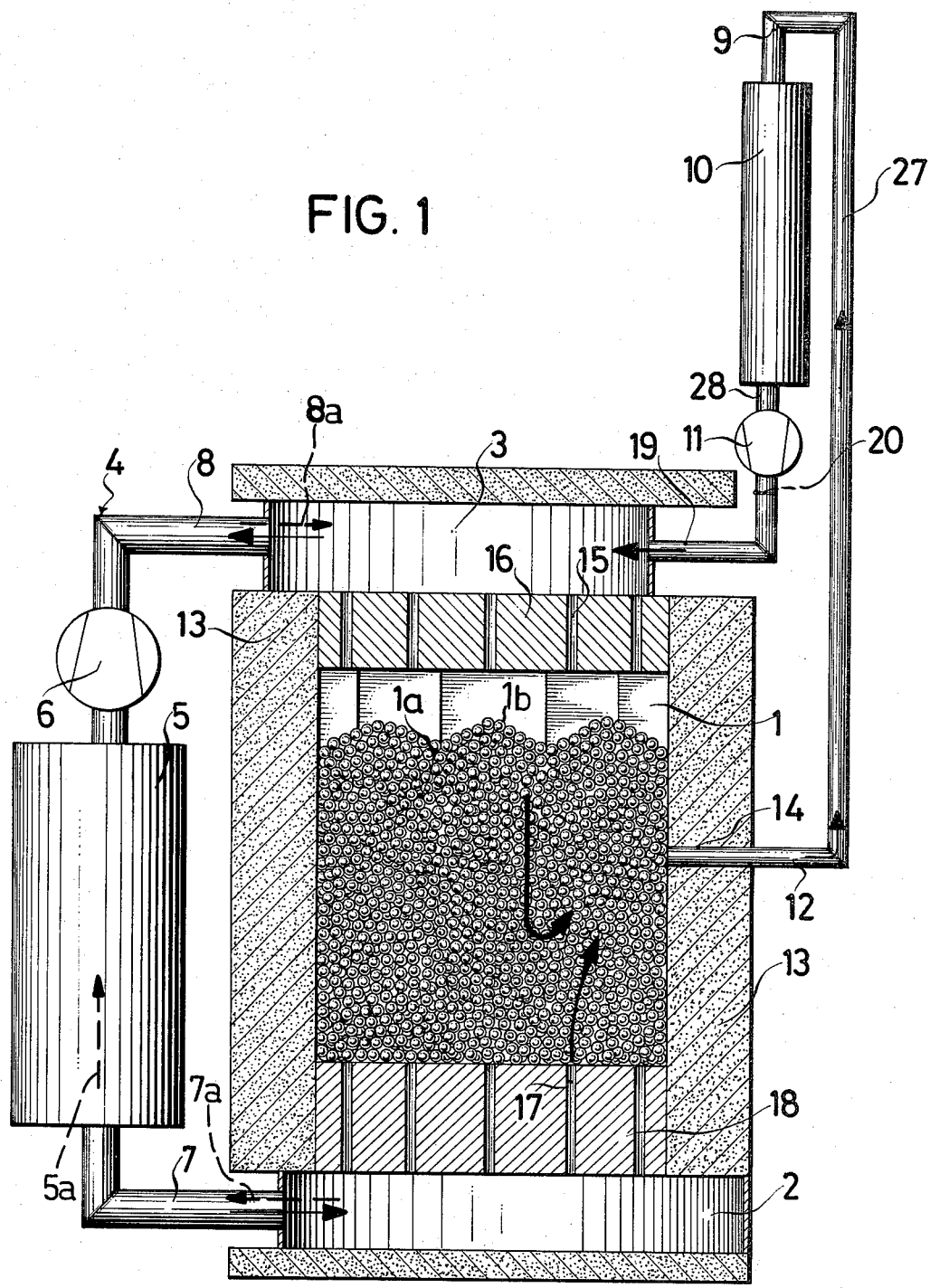
FIG. 1 is a vertical section through a reactor core showing a single operating loop and an after-heat system according to the invention also in the form of a single loop.

In FIG. 1 I have schematically shown a reactor core 1 for a piled-ball reactor of the gas-cooled type described previously and in which the top 1b of the pile 1a of the fuel element balls has been represented in dot-dash lines.

The reactor comprises a hot-gas chamber 2 below the pile and a cold-gas chamber 3 above the pile, these chambers forming part of the primary coolant circulation system.

The primary coolant circulation system or operating loop 4, which can represent one of a number of parallel operating loops, can comprise a heat exchanger 5 adapted to transfer primary reactor heat to a secondary coolant or other fluid, e.g. for the generation of electricity.

During the primary circulation, the coolant it withdrawn from the hot chamber 2 in the direction of the broken-line arrow 7a via the hot gas line 7, traverses the cooler 5 in the direction of the arrow 5a and is displaced by the blower 6 through the cold-gas line 8 (see arrow 8a) into the cold-gas chamber 3 whence it returns to the core. The cold gas percolates downwardly through the core and the power required to displace the cooling gas in the after-heat removal system can be relatively small. Another advantage of the system of the invention is that the after-heat removal system effectively cools the bottom reflector as well as the lower portion of the reactor core.

A swingable-flap check valve 20 is provided in the cooling gas return line 19 to close off the after-heat recovery system during normal operation of the primary cooling system and the operating loop. The check valve flap remains closed as long as the pressure in the chamber 3 remains greater than the pressure behind this flap. Of course, instead of an automatic check valve, a remotely controlled valve member may be provided.

Figure 2:
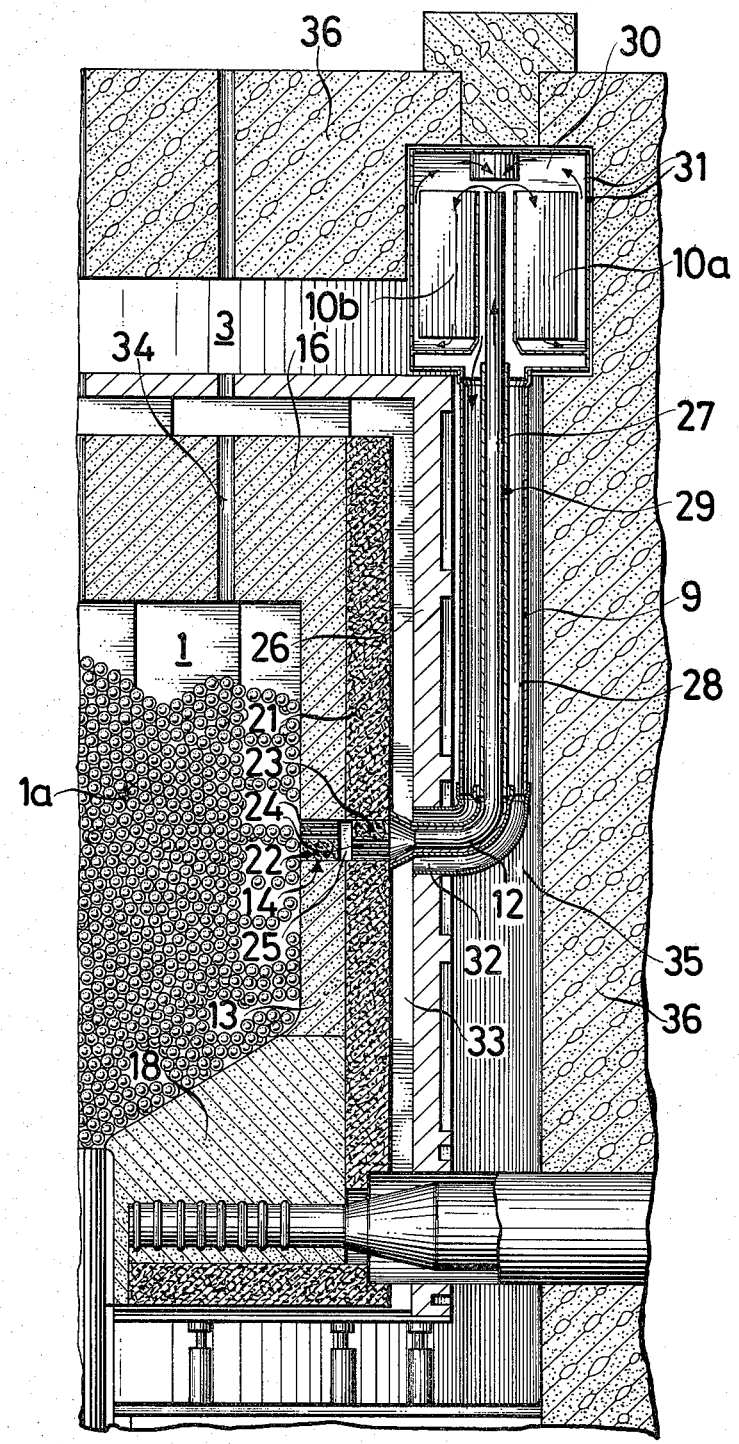
FIG. 2 is a section through a reactor core provided with a multiple-loop after-heat removal system.
Figure 3:
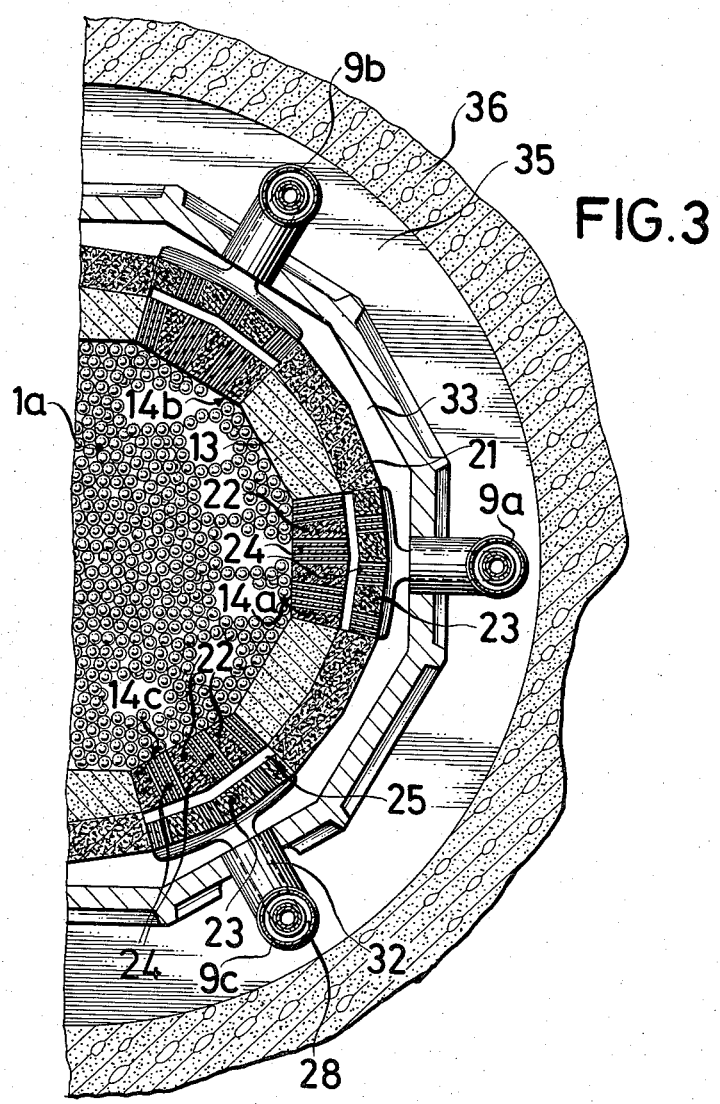
FIG. 3 is a cross section taken through the reactor core of FIG. 2 along the line III—III.

FIGS. 2 and 3 show in partial section a multiloop after-heat removal system for a gas-cooled reactor, the walls of which have been shown in greater detail. In this case, the after-heat removal loops at 9a, 9b, 9c each communicates at an intermediate location along the height of the ball pile 1a through the side reflector 13 surrounding the reactor core with the interior of the latter. These loops are connected in parallel with one another.

At each connection 14a, 14b 14c through the side reflector 13 for the respective loops 9a, 9b, 9c, there is provided an outer side reflector which surrounds this connection and which is composed of inner and outer reflector blocks 22, 23 with a small spacing 25 therebetween and positioned so that the flow path defined by the reflector blocks is offset, i.e. the passage of the inner block is offset from the passage of the outer block.

This ensures that there will be no straight line throughgoing path for neutrons from the interior of the core through the side reflectors. The outlet passage 12 is thereby protected against neutron radiation from the core 1.

The outlet passage or suction side 12 of each after-heat removal loop passes through a thermal shield 26 surrounding the reactor core and runs as a hot-gas riser 27 coaxially within a downcomer 28 through which the cold gas from the respective coolers 10a, 10b passes.

The hot-gas riser 27 is covered with thermal insulation 20 to reduce heat exchange within the coaxial pipes.

Each after-heat cooler 10a, 10b is provided with a blower at its outlet side as has been described in connection with FIG. 1, the blowers not being visible in FIGS. 2 and 3.

It has been found to be advantageous to utilize the cold gas to first cool the outer wall 31 of the heat exchanger chamber 30 enclosing the heat exchanger and to this end, the cold gas is directed along the inner side of the wall 31. The cold gas then flows through the downcomer 28 forming the cold gas return line 19.

The thermal shield 26 is provided with a coaxial feedthrough 32. The cold gas is thus introduced into the space 33 provided between the thermal shield 26 and the reflectors 13, 15, 18, i.e. the so-called reflector gap. The cold gas then flows from the reflector gas via the cold gas 34 into the top reflector 16 and then into the reactor core 1 as has been described in connection with FIG. 1.

The described flow path through the riser 27, the coolers 10a, 10b the downcomer 28 and the coaxial feedthrough 32 permits operation of the after-heat removal system even if one or more of its blowers becomes inoperative because of an electrical failure or the like. In this case, the after-heat removal utilizes the natural convection of cooling gases and the convective action is promoted by insulating the hot and cold gases from one another in the coaxial lines 27 and 28. Obviously this increases reactor safety.

The convective action also enables the forced circulation in the after-heat removal system to utilize a blower of limited capacity and energy consumption.

Furthermore, the arrangement shown in FIGS. 2 and 3 permits the circulated cooling gas to cool the intermediate compartment 33 of the reflector wall. Penetration of the after-cooling gas into the core except by return to the tunnel is precluded and the convective action can maintain a continuous circulation through the after-heat removal loops so that these loops are always in readiness for service as required. The heat exchanger in the heat-exchanger chambers 31 can be formed in control passages in the concrete containment vessel 36 of the high-temperature reactor and the after-heat removal loops can be distributed uniformly around the core in angularly equispaced relationship. For a reactor core with a thermal power of 500 MW, the cooling power for each after-heat removal loop can be at least 33% of the total after-heat removal requirement. Even upon failure of one to two operating loops, therefore, there will be little effect on the required cooling capacity for after-heat removal. The coolers 10a, 10b are preferably dimensioned with respect to the gas throughput to cool the gas by 100° to 305° C.

Upon depressurization of the reactor core, the temperature of the core should not exceed 800° C. and upon a breakdown under pressure, should be able to be reduced to about 600° C. in about two hours. Upon breakdown under pressure, the mass flow through the after-heat removal system should be about 6 kg/sec. whereas the mass flow in the gas of the pressure-relief shutdown should be about 2 kg/sec.

While the after-heat removal loops have been shown to be built into the concrete containment vessel in FIGS. 1 and 2, it should be understood that they can also be provided in separate pods thereon.

I claim:

1. In a gas-cooled nuclear reactor having a reactor core provided with a top reflector, a bottom reflector and a side reflector surrounding a pile of spherical fuel elements, at least one operating loop for primary cooling of said core and including a gas inlet at said top reflector above said core, a gas outlet at said bottom reflector below said core, at least one primary heat exchanger, and means for circulating primary coolant gas from said inlet through said core to said outlet and from said outlet through said heat exchanger to said inlet, the improvement which comprises an after-heat removal system for removing heat from said core upon inactivation of said operating loop, said after-heat removal system comprising at least one after-heat removal loop including:

means forming an outlet passage in said side reflector spaced from said inlet and said outlet and opening within the pile of balls;

a suction duct connected to said outlet for drawing hot cooling gas from said core;

an after-heat cooler connected to said suction duct for cooling the hot cooling gas; and a return duct connecting said cooler with said inlet for returning relatively cold cooling gas thereto.

2. The improvement defined in claim 1 wherein said return duct is formed as a downcomer inducing convective gas flow through said after-heat removal loop.

3. The improvement defined in claim 2 wherein said suction duct is formed as a riser coaxial with said downcomer.

4. The improvement defined in claim 1 wherein said side reflector is surrounded by a thermal shield and defines a space therewith, said space forming part of said return duct.

5. The improvement defined in claim 1 wherein said return duct is provided with a closure adapted to be opened to activate said after-heat removal loop in an emergency.

6. The improvement defined in claim 1 wherein said suction duct communicates through mutually offset openings in spaced-apart reflector elements thereby shielding said suction duct from neutrons from said core.

7. The improvement defined in claim 1 wherein said reactor is provided with a plurality of such after-heat removal loops in spaced-apart relationship and connected in parallel.

8. The improvement defined in claim 3, claim 6 or claim 7 wherein said cooler is provided on a containment vessel surrounding said reflectors at a location above said core.

* * * * *